United States Patent
Sano

(10) Patent No.: US 9,407,174 B2
(45) Date of Patent: Aug. 2, 2016

(54) SHOVEL AND METHOD OF CONTROLLING SHOVEL

(71) Applicant: SUMITOMO(S.H.I.) CONSTRUCTION MACHINERY CO., LTD., Tokyo (JP)

(72) Inventor: Kiminori Sano, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 104 days.

(21) Appl. No.: 14/180,522

(22) Filed: Feb. 14, 2014

(65) Prior Publication Data

US 2014/0239636 A1    Aug. 28, 2014

(30) Foreign Application Priority Data

Feb. 26, 2013 (JP) ................. 2013-036300

(51) Int. Cl.
*H02P 1/00* (2006.01)
*E02F 9/22* (2006.01)
*H02P 4/00* (2006.01)

(52) U.S. Cl.
CPC ............... *H02P 1/00* (2013.01); *E02F 9/2221* (2013.01); *H02P 4/00* (2013.01)

(58) Field of Classification Search
CPC ..................... H02P 1/00; H02P 4/00
USPC ................................. 290/7; 701/22
See application file for complete search history.

(56) References Cited

U.S. PATENT DOCUMENTS

| 5,816,102 | A | * | 10/1998 | Kern et al. ............. 74/412 R |
|---|---|---|---|---|
| 2005/0121916 | A1 | * | 6/2005 | Olsen et al. ............. 290/52 |
| 2009/0320461 | A1 | * | 12/2009 | Morinaga et al. ........... 60/431 |
| 2011/0028268 | A1 | * | 2/2011 | Kang et al. ................. 477/3 |
| 2011/0029175 | A1 | * | 2/2011 | Kang et al. ............... 701/22 |
| 2011/0098873 | A1 | * | 4/2011 | Koga et al. ............... 701/22 |
| 2012/0089288 | A1 | * | 4/2012 | Kawashima ............. 701/22 |
| 2013/0221746 | A1 |  | 8/2013 | Nakayama |
| 2014/0086757 | A1 | * | 3/2014 | Kang et al. .............. 417/16 |

FOREIGN PATENT DOCUMENTS

| JP | 2000-154803 | 6/2000 |
|---|---|---|
| JP | 2010-173599 | 8/2010 |
| WO | WO 2010147121 A1 * | 12/2010 |
| WO | 2012/060426 | 5/2012 |

* cited by examiner

*Primary Examiner* — Tulsidas C Patel
*Assistant Examiner* — Sean Gugger
(74) *Attorney, Agent, or Firm* — IPUSA, PLLC

(57) ABSTRACT

A shovel includes an internal combustion engine whose revolution speed is controlled to be constant, a hydraulic pump connected to the internal combustion engine, a generator connected to the internal combustion engine, and a control unit for controlling the generator, wherein the control unit causes the generator to perform an electrical power generating operation in a case where a load on the hydraulic pump is increasing.

9 Claims, 11 Drawing Sheets

SHOVEL AND METHOD OF CONTROLLING SHOVEL

RELATED APPLICATIONS

This patent application is based upon and claims the benefit of priority of Japanese Patent Application No. 2013-036300 filed on Feb. 26, 2013, the entire contents of which are incorporated herein by reference.

BACKGROUND

1. Technical Field

The present invention relates to a shovel operating while supplying a hydraulic pressure, which is generated by a hydraulic pump driven by an engine, to a hydraulic operating element.

2. Description of the Related Art

For example, if a boom as the hydraulic operation element is started being driven while a shovel is operated, the hydraulic load suddenly increases. Then, a load to an engine, which is provided to drive the hydraulic pump, suddenly increases. Therefore, even though a hydraulic load suddenly increases, it is proposed that the output of the hydraulic pump is suppressed for a predetermined time after the hydraulic load starts increasing in order to restrict an abrupt increase of the load on the engine.

SUMMARY

According to an embodiment of the present invention, there is provided a shovel included an internal combustion engine whose revolution speed is controlled to be constant, a hydraulic pump connected to the internal combustion engine, a generator connected to the internal combustion engine, and a control unit for controlling the generator, wherein the control unit causes the generator to perform an electrical power generating operation in a case where a load on the hydraulic pump is increasing.

DETAILED DESCRIPTION

In the suppression of the output of the hydraulic pump, an abrupt increase of the load of the hydraulic pump is suppressed (namely, the output of the hydraulic pump is strongly limited). However, immediately after the load on the hydraulic pump is decreased, the engine torque abruptly increases so as to be recovered. Along with the recovery of the engine torque, a once decreased engine revolution speed immediately increases so as to be recovered. Therefore, in an engine whose revolution speed is made constant, an output control of the engine is performed and the engine torque is decreased again. At this time, the load on the engine remains small because the output of the hydraulic pump is strongly limited without recovering to an ordinary output limit. Therefore, it is not controlled to increase the amount of fuel injection. Thus, when the output of the hydraulic pump is increased, the engine revolution speed is drastically decreased.

Therefore, there is desired a development of a technique for increasing an engine output while suppressing a drastic decrease in an engine revolution speed even where a hydraulic load suddenly increases.

A description is given below, with reference to the FIG. 1 through FIG. 11 of embodiments of the present invention.

Where the same reference symbols are attached to the same parts, repeated description of the parts is omitted.

Figure 1:
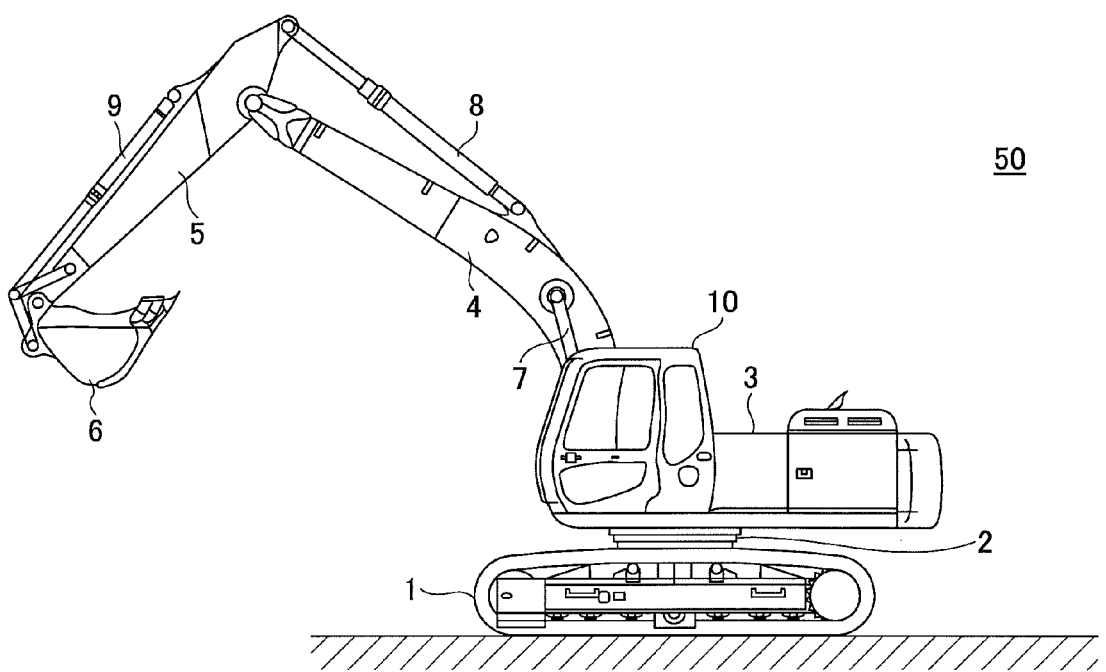
FIG. 1 is a side view of a shovel.

FIG. 1 is a side view of a shovel 50 to which the present invention is applied. The shovel, to which the present invention is applied, is not limited to the shovel 50 illustrated in FIG. 1, and may be a shovel having another structure as long as the shovel has a driven element, for example, a generator, which can apply a load on an engine by being driven by the engine.

An upper-part swiveling body 3 is installed in a lower-part traveling body 1 of the shovel 50 via a swivel mechanism 2. A boom 4 is attached to the upper-part swiveling body 3. An arm 5 is attached to an end of the boom 4, and a bucket 6 is attached to the end of the arm 5. The boom 4, the arm 5, and the bucket 6 are hydraulically driven by a boom cylinder 7, an arm cylinder 8, and a bucket cylinder 9, respectively. The upper-part swiveling body 3 has a cabin 10 and a power source such as an engine.

Figure 2:
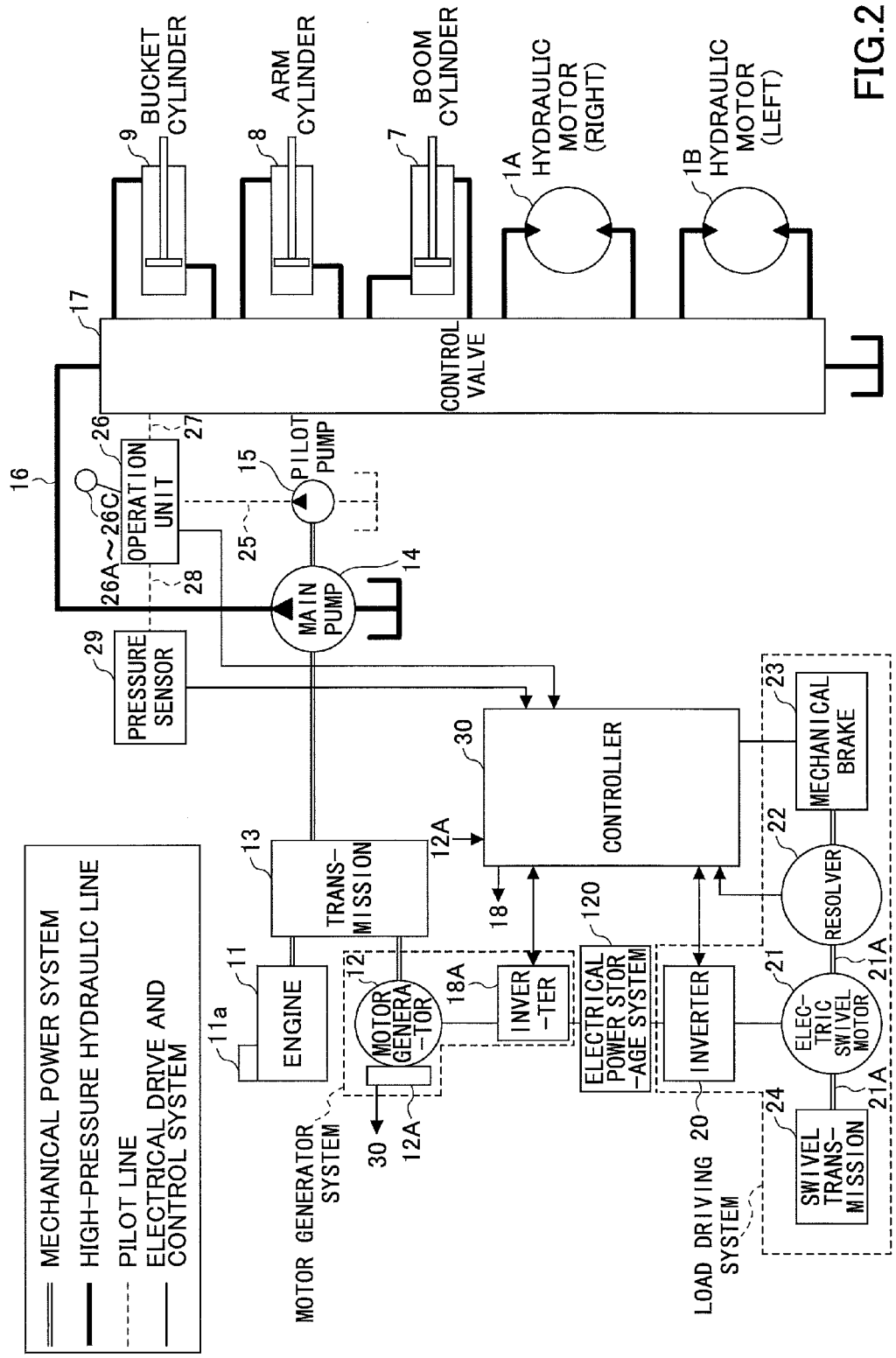
FIG. 2 is a block diagram illustrating a structure of a drive system of a shovel of an embodiment.

FIG. 2 is a block diagram illustrating a drive system of the working machine illustrated in FIG. 1. Referring to FIG. 2, a mechanical power system is indicated by a double line, a high-pressure hydraulic line is indicated by a bold solid line, a pilot line is indicated by a broken line, and an electrical drive and control system is indicated by a thin solid line (a thin line).

An engine 11 as a mechanical drive part and a motor generator 12 as an assist drive part are both connected to two input shafts of a transmission 13. A main pump 14 as a hydraulic pump and a pilot pump 15 are connected to an output shaft of the transmission 13. A control valve 17 is connected to the main pump 14 through a high-pressure hydraulic line 16.

The control valve 17 is a control unit that controls a hydraulic system of the shovel. Hydraulic motors 1A (for the right) and 1B (for the left) for the lower-part traveling body 1, the boom cylinder 7, the arm cylinder 8, and the bucket cylinder 9 are connected to the control valve 17 through the high-pressure hydraulic line 16.

An electric power storage system 120 is connected to the motor generator 12 through an inverter 18A. A revolution detector 12A for detecting the revolution speed (the number of revolutions) is provided in the motor generator 12. The revolution speed of the motor generator 12 detected by the revolution detector 12A is supplied to the controller 30.

An operation unit 26 is connected to the pilot pump 15 through a pilot line 25. The operation unit 26 includes a lever 26A, a lever 26B, and a pedal 26C. The lever 26A, the lever 26B and the pedal 26C are connected to the control valve 17 and a pressure sensor 29 through hydraulic lines 27 and 28. The pressure sensor 29 is connected to the controller 30 which controls a drive of an electric system. Further, in a case where the operation unit 26 is an electric type, an electric signal output from the operation unit 26 may be used as a detection value in an operation state detecting unit instead of a signal output from a pilot pressure sensor (hereinafter, referred to as a pressure sensor).

In the shovel illustrated in FIG. 2, the swivel mechanism is electromotive. A swivel motor 21 is provided to drive the swivel mechanism 2. The electric swivel motor 21 as an electromotive operation element is connected to the electric power storage system 120 through the inverter 20. A resolver 22, a mechanical brake 23, and a swivel transmission 24 are connected to a rotation shaft 21A of the electric swivel motor 21. A load driving system is formed by the electric swivel motor 21, the inverter 20, the resolver 22, the mechanical brake 23, and the swivel transmission 24.

The controller 30 is a control unit as a main control part for performing a drive control of the shovel 50. The controller 30 includes an arithmetic processing unit including a central processing unit (CPU) and an internal memory. When the CPU executes a program for the drive control stored in the internal memory, the controller is substantialized.

The controller 30 converts a signal supplied from the pressure sensor 29 to a speed command to thereby perform the control drive of the electric swivel motor 21. The signal supplied from the pressure sensor 29 corresponds to a signal indicative of an operation amount of operating the operation unit 26 for swiveling the swivel mechanism 2.

The controller 30 switches over a drive control of the motor generator 12 between an electromotive (assisting) operation and an electric generation, and simultaneously performs a charge or discharge control in a capacitor 19 by performing the drive control of the buck-boost converter 100 (see FIG. 3) as a buck-boost controlling part. The controller 30 switches over the buck-boost converter 100 between an boosting operation and a bucking operation based on a charging condition of the capacitor 19, a running condition (the electromotive (assisting) operation or the electrical power generating operation) of the motor generator 12, and a running condition (a power-running operation or a regenerating operation) of the electric swivel motor 21, and performs a charge or discharge control in the capacitor 19 by switching the buck-boost converter 100. Further, the controller 30 calculates a state of charge SOC of an electrical energy storage device (a capacitor) based on a voltage value of the electrical energy storage device detected by a voltage detecting portion for the electrical energy storage device.

Figure 3:
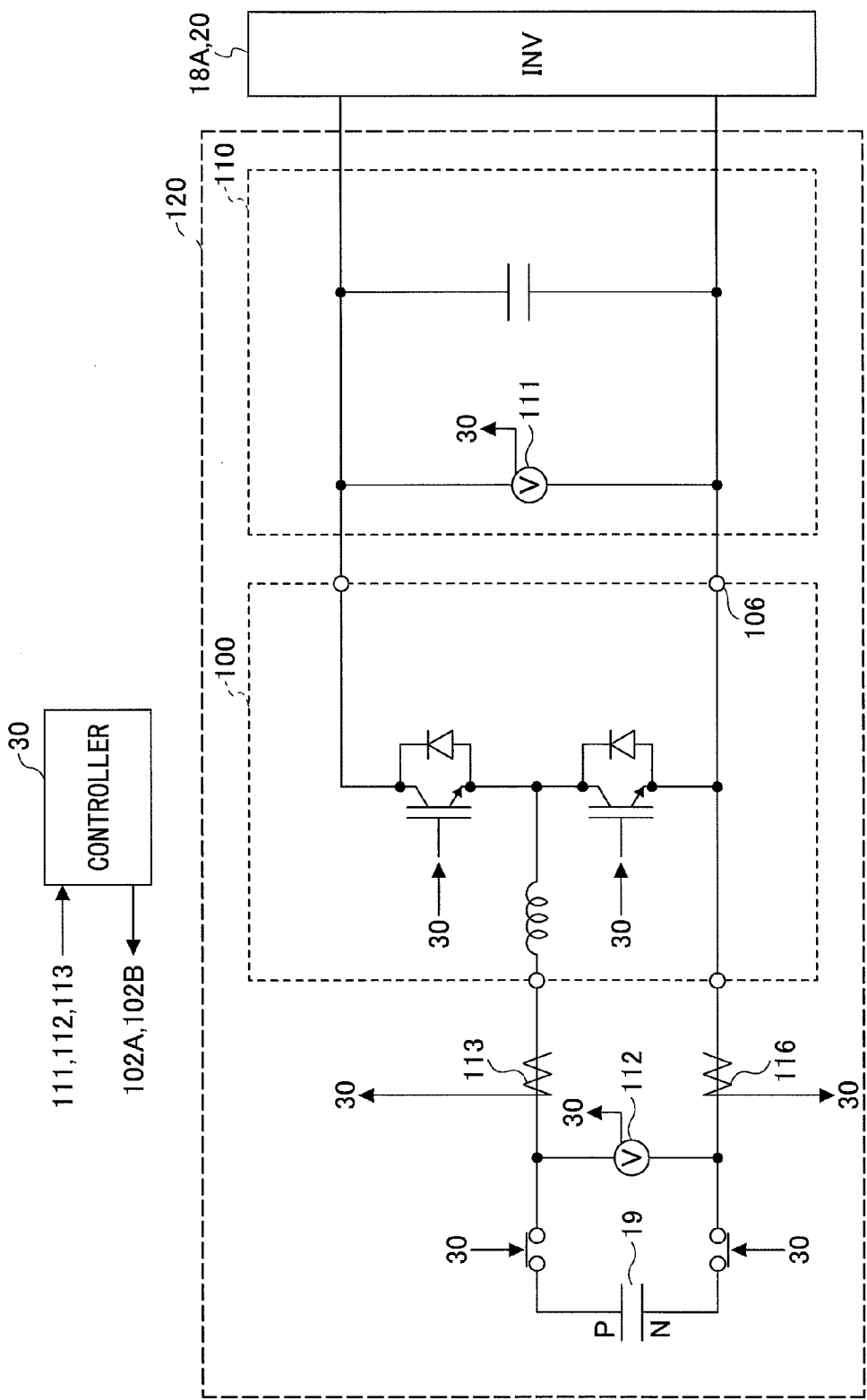
FIG. 3 is a circuit diagram of an electric power storage system.

FIG. 3 is a circuit diagram of an electrical power storage system 120. The electric power storage system 120 includes a capacitor 19 as an electric power storage device, a buck-boost converter 100, and a DC bus 110. The DC bus 110 controls transfer of electric power among the capacitor 19, the motor generator 12, and the electric swivel motor 21. The capacitor 19 includes a capacitor voltage detecting unit 112 for detecting a capacitor voltage value and a capacitor current detecting unit for detecting a capacitor current value. The capacitor voltage value and the capacitor current value, which are detected by the capacitor voltage detecting unit 112 and the capacitor current detecting unit 113, respectively, are supplied to the controller 30.

The buck-boost converter 100 switches over between the boosting operation and the bucking operation so as to converge a DC bus voltage value within a predetermined range depending on the running condition of the motor generator 12 and the running condition of the electric swivel motor 21. The DC bus 110 is provided among the inverter 18A as drive control unit, the inverter 20 as a drive control unit, and the buck-boost converter 100 to transfer electric power among the capacitor 19, the motor generator 12, and the electric swivel motor 21.

A switch-over control between the boosting operation and the bucking operation in the buck-boost converter 100 is performed based on the DC bus voltage value detected by the DC bus voltage detecting unit 111, the capacitor voltage value detected by the capacitor voltage detecting unit 112, and the capacitor current value detected by the capacitor current detecting unit 113.

In the above described structure, the electric power generated by the motor generator 12 being the assist motor is supplied to the DC bus 110 of the electrical power storage system 120 through the inverter 18A and supplied to the capacitor 19 through the buck-boost converter 100. The regenerative electrical power generated by the electric swivel motor 21 as the assist motor is supplied to the DC bus 10 of the electrical power storage system 120 through the inverter 20 and supplied to the capacitor 19 through the buck-boost converter 100.

The capacitor 19 may be an electrical power storage device which can be charged and discharged so that electrical power is transferred between the capacitor 19 and the DC bus 110 through the buck-boost converter 100. FIG. 3 illustrates the capacitor 19 as the electrical energy storage device. However, a chargeable and dischargeable secondary battery such as a lithium ion battery, a lithium ion capacitor, or another mode of a power source capable of transferring the electrical power may be used instead of the capacitor 19.

In the shovel having the above structure, a load can be applied to the engine 11 by causing the motor generator to perform the electrical power generating operation while the output of the main pump is increasing. With this, it is possible to smoothly increase the engine torque by restricting a drop of the engine revolution speed which is caused when the hydraulic load abruptly increases. Hereinafter, a method of controlling the shovel as described above is explained.

Figure 4:
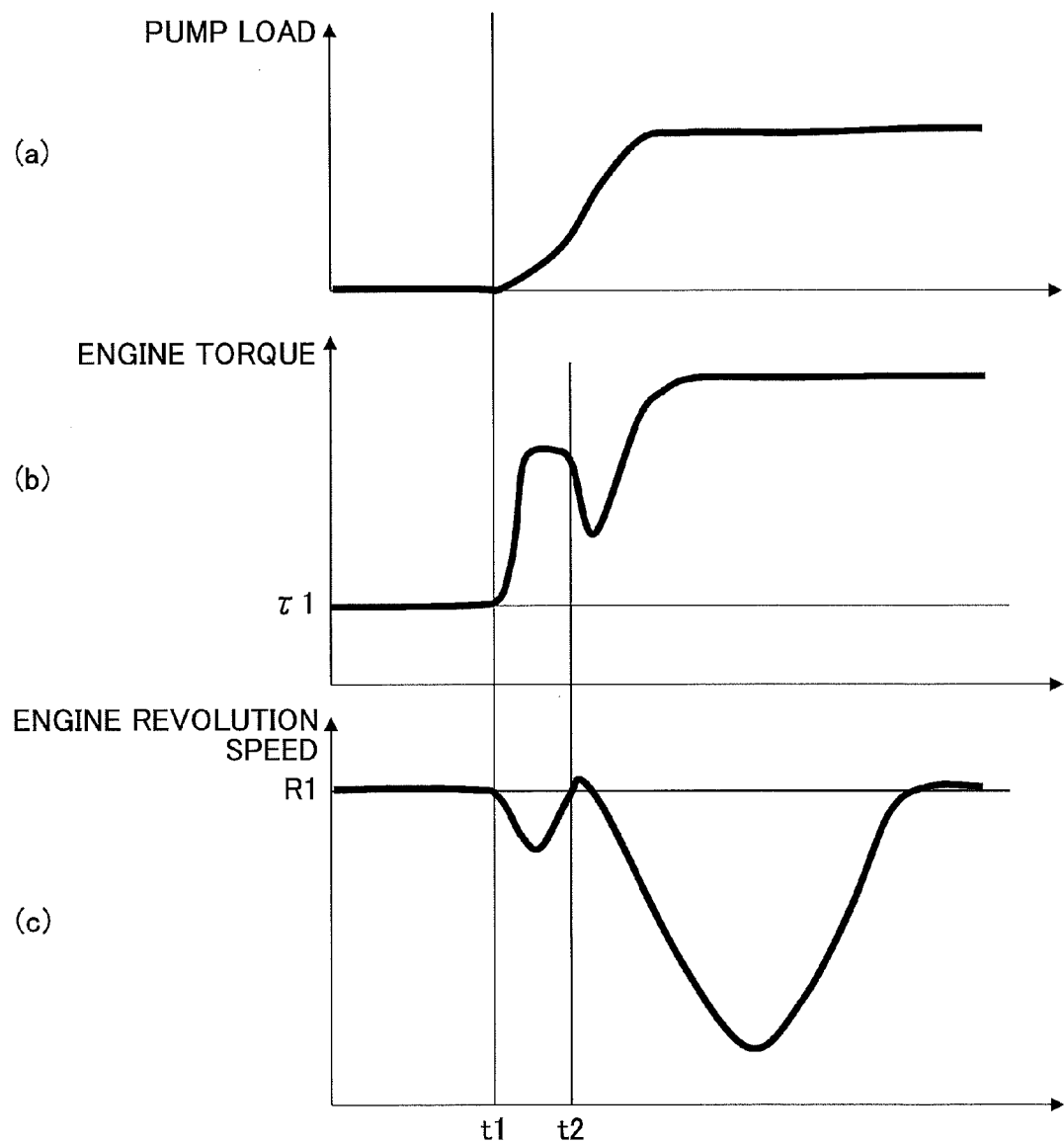
FIG. 4 is a time chart for explaining a drop of an engine revolution speed occurring when a hydraulic load increases.

FIG. 4 is a time chart for explaining a drop of an engine revolution speed occurring when a hydraulic load increases. In FIG. 4, (a) is a graph illustrating a change in the pump load, (b) is a graph illustrating a change in an engine torque, and (c) is a graph illustrating a change in the engine revolution speed.

As illustrated in (a) of FIG. 4, the pump load starts increasing at a time t1. The pump load is applied to the engine 11 for driving the main pump 14 being a hydraulic pump. The reason why the pump load increases is that the main pump 14 is driven to supply a high-pressure operating oil to the boom cylinder 7, the arm cylinder 8, the bucket cylinder 9, or the like when a hydraulic operation element such as the boom 4, the arm 5, the bucket 6, or the like is operated.

When the pump load starts increasing at the time t1, as illustrated in (b) of FIG. 4, the engine torque for driving the main pump 14 abruptly increases. At this time, it is not possible to maintain the engine revolution speed to be a preset revolution speed R1, and the engine revolution speed drops as illustrated in (c) of FIG. 4. However, after the engine torque increases to a certain extent, the engine revolution speed also increases. At a time t2, the engine revolution speed recovers to the preset revolution speed R1. The revolution speed of the engine 11 is controlled by a control of making the revolution speed constant. Thus, the amount of fuel injection is controlled so that the revolution speed of the engine 11 is constantly maintained to be the preset revolution speed R1.

Because the hydraulic pump is not driven until the time t1, the engine 11 is in an idling state, and the engine torque is a no-load torque τ1. Because the pump load increases on or after the time τ1, the amount of fuel injection to the engine 11 is increased so that the engine torque increases. The increase of the engine torque on or after the time t1 is more abrupt than the increase of the pump load. Therefore, the engine torque increases to a certain level within a short time. Accordingly, sufficient engine torque is output relative to the pump load. Under this state, the engine revolution speed recovers to the preset revolution speed R1. Because the engine torque is sufficiently great relative to the pump load, the amount of fuel injection to the engine 11, which has been increasing on or after the time t1, is then suppressed (decreased). With this, on or after the time t2, the engine torque abruptly decreases as illustrated in (B) of FIG. 4.

However, the pump load continuously increases on or after the time t2. The engine torque cannot withstand the increasing pump load, and the engine revolution speed drops again. At this time, the amount of fuel injection is increased so that the decreased engine torque is increased again. However, the engine torque cannot immediately follow the increased pump load. Therefore, a state where the engine torque is not sufficient for the pump load continues for a while, and the engine revolution speed is excessively decreased as illustrated in (c) of FIG. 4 without preventing the engine revolution speed from decreasing.

The excessive decrease of the engine revolution speed along with the increase of the pump load described above introduces an excessive increase of the amount of fuel injection in order to recover the engine revolution speed. Therefore, the fuel consumption of the engine 11 is caused to be degraded. Within the embodiment, an excessive decrease of the engine revolution speed is prevented by causing the motor generator 12 to perform an electrical power generating operation while the pump load is increasing to adjust the load on the engine 11.

Figure 5:
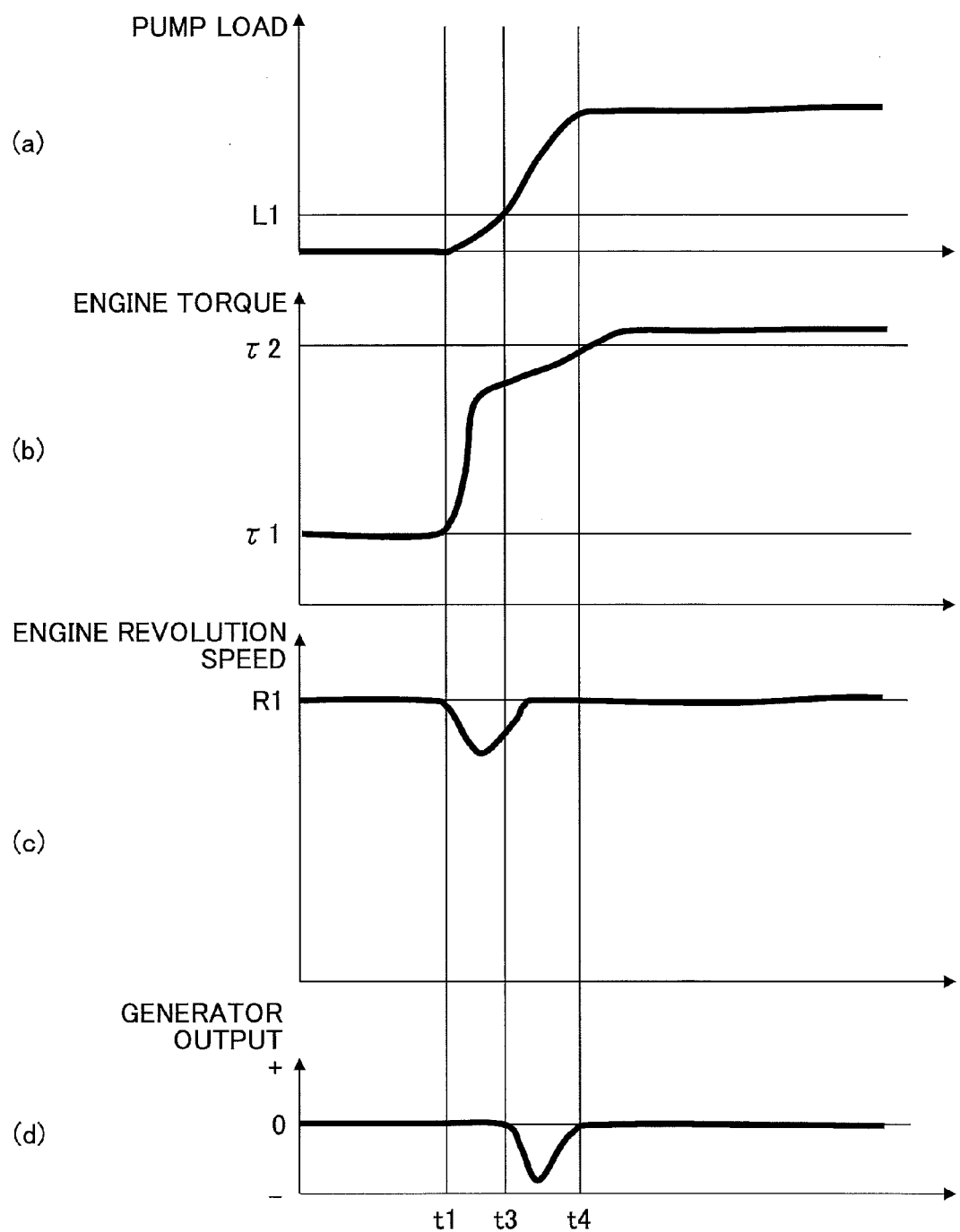
FIG. 5 is a time chart for explaining a change of an engine revolution speed when a motor generator undergoes an electrical power generating operation while a pump load is increasing.

FIG. 5 is a time chart for explaining a change of an engine revolution speed when the motor generator 12 undergoes the electrical power generating operation while the pump load is increasing within the embodiment. In FIG. 5, (a) is a graph illustrating a change in the pump load, (b) is a graph illustrating a change in an engine torque, and (c) is a graph illustrating a change in the engine revolution speed. In FIG. 5, (d) is a graph illustrating a change in the output from the motor generator 12. In the ordinate axis of (d) of FIG. 5, a minus side less than zero represents an output by electrical power generation, and a plus side greater than zero represents an output by power-running. The increase of the pump load illustrated in (a) of FIG. 5 is the same as the increase of the pump load illustrated in (a) of FIG. 4.

As illustrated in (a) and (b) of FIG. 5, within the embodiment, when the pump load reaches a preset load L1 having a predetermined amount, the motor generator 12 is caused to perform the electrical power generating operation even though the pump load is increasing. In the electrical power generating operation of the motor generator 12, the output of the engine 11 is a drive source for the electrical power generating operation. Therefore, the load caused by the electrical power generating operation of the motor generator 12 is applied to the engine 11, and the load on the engine 11 appropriately increases on or after a time t3. Therefore, the amount of fuel injection to the engine 11 increases on or after the time t3 so that the engine torque continuously increase on or after the time t3 as illustrated in (b) of FIG. 5.

Because the engine torque continuously increases on or after the time t3, the engine 11 withstands the pump load and the engine revolution speed increases so as to be recovered to the preset revolution speed R1 as illustrated in (c) of FIG. 5. Further, after the engine revolution speed is recovered to the preset revolution speed R1, the engine revolution speed is maintained to be the preset revolution speed R1. As described, on or after the time t3, the engine revolution speed does not decrease and is maintained to be the preset revolution speed R1. Therefore, the excessive decrease of the engine revolution speed described above is prevented from occurring.

At the time t3 when the motor generator 12 performs the electrical power generating operation, the pump load increases to be the predetermined preset load L1. The time t3 is earlier than a time when the engine revolution speed is recovered to the preset revolution speed R1 (the time t2 in (c) of FIG. 4).

Within the embodiment, the revolution speed (the number of revolutions) of the motor generator 12 is controlled and the target revolution speed of the motor generator 12 is set to be a value slightly lower than a revolution speed corresponding to the preset revolution speed R1 of the engine 11 as described below so that the motor generator 12 performs the electrical power generating operation.

Referring to (b) of FIG. 5, on or after the time t3, the engine torque continuously increases and reaches a preset torque τ2 at a time t4. The preset torque is set to a torque value lower by a predetermined value from a torque which can be output by the engine 11 when the pump load is set to be the maximum. Specifically, the preset torque τ2 is set to have a torque value where the engine torque can be securely increased by controlling only the revolution speed of the engine 11 after the engine torque reaches the torque value.

At a time t4 when the engine torque reaches the preset torque τ2, the electrical power generating operation of the motor generator 12 is deactivated, and the electrical power generating operation is stopped. The engine revolution speed reaches the preset revolution speed R1 before the time t4, and the engine revolution speed is maintained to be the preset revolution speed R1 on or after the time t4.

Figure 6:
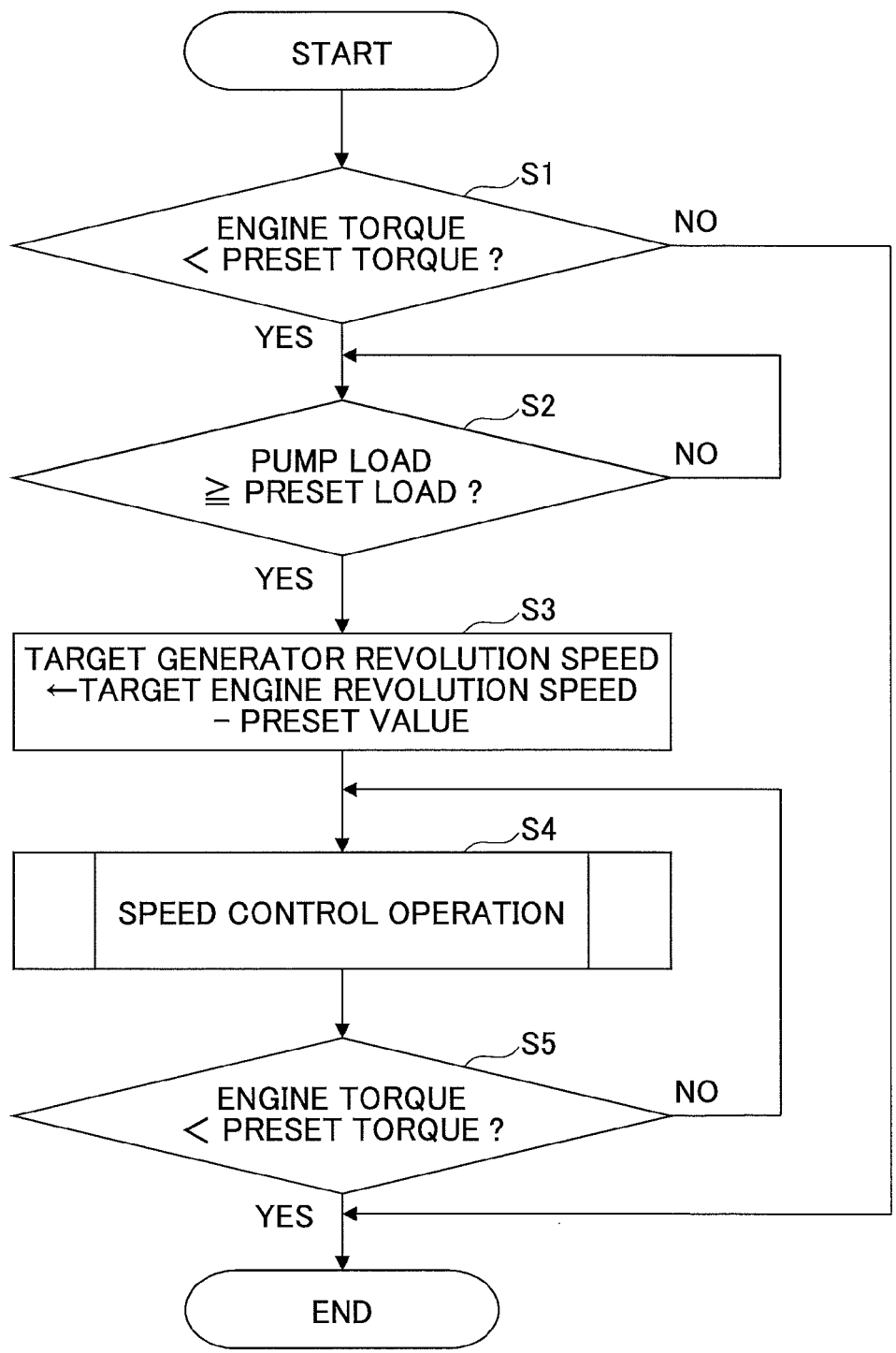
FIG. 6 is a flow chart of an exemplary process of controlling an engine revolution speed.

FIG. 6 is a flowchart of a process of controlling the engine revolution speed according to the above method of controlling the shovel. The process of controlling the engine revolution speed illustrated in FIG. 6 is mainly performed by the controller 30.

After the process of controlling the engine revolution speed is started, it is determined whether the engine torque is smaller than the preset torque τ2 in step S1. In a case where the engine torque is equal to or greater than the preset torque τ2 in NO of step S1, the process of controlling the engine revolution speed is not performed, and the process ends. In a case where the engine torque is smaller than the preset torque τ2 in YES of step S1, the process moves to step S2.

In step S2, it is determined whether the pump load is equal to or greater than a preset load L1. When the pump load is smaller than the preset load L1 in NO of step S2, step S2 is repeated until the pump load becomes equal to or greater than the preset load L1. In step S2, if it is determined that the pump load is equal to or greater than the preset load L1 in YES of step S2, the process moves to step S3. In the example illustrated in (a) of FIG. 5, the pump load is determined to be equal to or greater than the preset load L1 at the time t3. The pump load can be assumed based on the discharge pressure of the main pump and an electric current, the discharge pressure and the flow rate of the operating oil, or the like.

In step S3, the target revolution speed of the motor generator 12 is set so as to have a value slightly smaller than the revolution speed corresponding to the preset revolution speed R1 of the engine 11. Specifically, a value slightly lower than the revolution speed corresponding to the preset revolution speed R1 of the engine 11 is set, and the preset value is subtracted from the revolution speed corresponding to the preset revolution speed R1 from the revolution speed corresponding to the preset revolution speed R1 to thereby set the target revolution speed of the motor generator 12. Here, the motor generator 12 is switched to control the revolution speed, for example, at the time t1. Therefore, the motor generator 12 runs at a revolution speed higher than the target revolution speed. In order to apply the load on the engine 11 to suppress the revolution and to make the revolution speed approach the target revolution speed, the electrical power generating operation is performed. In an example illustrated in (d) of FIG. 5, the motor generator 12 starts an electrical power generating operation at a time t3.

Subsequently, in step S4, the motor generator 12 is controlled by a speed control and an output by electrical power generation increases. Because the engine revolution speed increases on and after the time t3 so as to approach the preset revolution speed R1, the revolution speed of the motor generator 12 approaches the target revolution speed and the electric-generating capacity in the motor generator 12 becomes small.

In step S5, it is determined whether the engine torque is equal to or greater than the preset torque $\tau 2$. In a case where the engine torque does not reach the preset torque $\tau 2$ (NO in step S5), the process returns to step S4 and a speed control of the motor generator 12 is continued. Said differently, an electrical power generating operation of the motor generator 12 continues.

On the other hand, in a case where it is determined that the engine torque reaches the preset torque $\tau 2$ (YES in step S5), the speed control of the motor generator 12 is deactivated so that the motor generator 12 stops the electrical power generating operation. In an example illustrated in (d) of FIG. 5, the electric-generating capacity becomes substantially zero at a time t4 when the engine torque reaches the preset torque $\tau 2$. In this embodiment, at the time t4 when the engine torque reaches the preset torque $\tau 2$, the electrical power generating operation of the motor generator 12 is stopped by switching the control of the motor generator 12 to an ordinary torque control. As described, on or after the time t4, the engine torque can be increased by the control of making the revolution speed of the engine 11 constant.

By controlling the revolution speed of the engine 11 using the above method of controlling the shovel, it is possible to suppress an excessive decrease of the engine revolution speed while the pump load is abruptly increasing. Thus, it is possible to solve a problem caused by the excessive decrease of the engine revolution speed.

In step S2 described above, if it is determined that the pump load is equal to or greater than the preset load L1, the motor generator 12 performs the electrical power generating operation. However, a timing of starting the electrical power generating operation of the motor generator 12 can be determined by another method. As the other method, for example, the horse power (flow rate×pressure) of the main pump 14 is monitored as the load. At the time when the horse power reaches the predetermined value, the motor generator 12 is caused to perform the electrical power generating operation. Alternatively, a discharge pressure force of the main pump 14 is monitored as the load. At the time when the discharge pressure force reaches a predetermined value, the motor generator 12 may be caused to perform the electrical power generating operation. Further, the electrical power generating operation of the motor generator 12 may be started at a time when the engine revolution speed is recovered to a predetermined revolution speed around the preset revolution speed R1 without determining a start time of the electrical power generating operation based on the load of the main pump 14.

Next, an embodiment in a case where a variable capacity hydraulic pump is used as the main pump 14 is described.

Within the embodiment, the main pump 14 is a variable capacity hydraulic pump, in which an angle (a tilting angle) of a swash plate is controlled to adjust the stroke of a piston thereby controlling a discharge flow rate. Within the embodiment, a supercharger 11a is provided in the engine 11. The supercharger 11a causes the output of the engine 11 to increase by increasing an intake pressure (by generating a supercharge pressure) using an exhaust gas exhausted from the engine 11.

Figure 7:
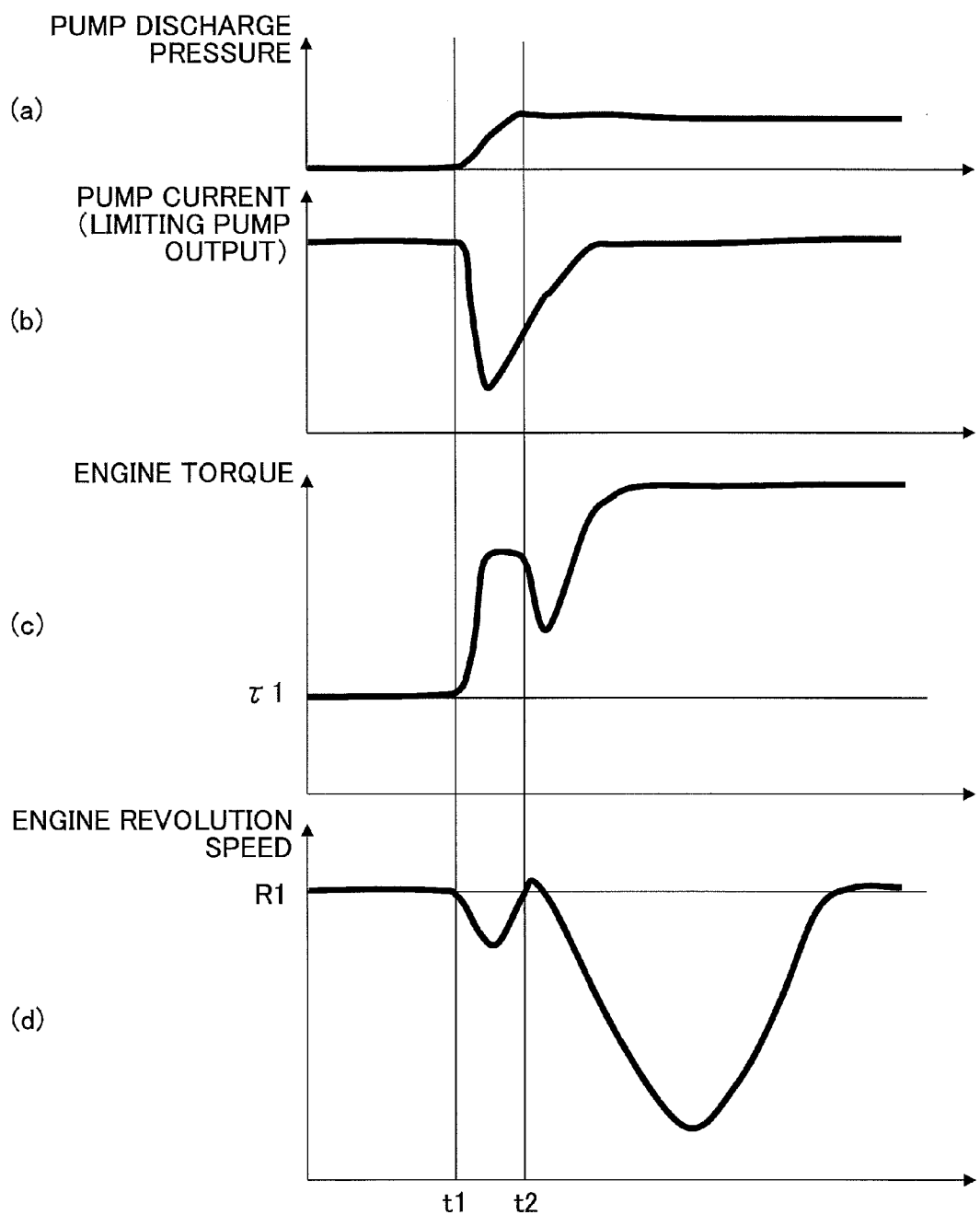
FIG. 7 is a time chart for explaining a drop of an engine revolution speed occurring when a hydraulic load increases.

In the variable capacity hydraulic pump, the pump current is controlled to change the tilting angle of the swash plate. Thus, a pump output limit can be changed by the variable capacity hydraulic pump. Because the pump output corresponds to the pump load, it is possible to determine a start timing and a stop timing in the electrical power generating operation of the motor generator 12 by monitoring the output limit (i.e., a pump current) of the pump output. FIG. 7 is a time chart for explaining a drop of the engine revolution speed occurring when a hydraulic load increases. Referring to FIG. 7, (a) is a graph illustrating a change in a pump discharge pressure, and (b) is a graph illustrating a change in a pump current (a pump output limit). Referring to FIG. 7, (c) is a graph illustrating a change in an engine torque, and (d) is a graph illustrating a change in a pump discharge pressure.

As illustrated in (a) of FIG. 7, the pump discharge pressure starts increasing at a time t1. The reason why the pump discharge pressure increases is that the main pump 14 is driven to supply a high-pressure operating oil to the boom cylinder 7, the arm cylinder 8, the bucket cylinder 9, or the like when a hydraulic operation element such as the boom 4, the arm 5, the bucket 6, or the like is operated.

At the time t1, a great hydraulic load is applied, a pump load on the main pump 14 increases, and the pump discharge pressure increases as illustrated in (a) of FIG. 7. Then, a pump current is decreased and a pump output limit is decreased as illustrated in (b) of FIG. 7. The pump output limit is maximally limited on or before the time t1 and is abruptly decreased on or after the time t1. In a case where the pump output limit is 100% at a maximum, the pump output limit is decreased to, for example, 50% on or after the time t1. When the pump output limit is decreased, a greater output can be obtained from the pump.

When the pump output limit is decreased on or after the time t1 so that the main pump 14 is driven to generate a great output, the engine torque abruptly increases to drive the main pump 14 as illustrated in (c) of FIG. 7. Along with this, the engine revolution speed is not constantly maintained, and the engine revolution speed drops. However, when the engine torque is increase to a certain extent, the engine revolution speed is recovered to the preset revolution speed R1 at a time t2. The revolution speed of the engine 11 is controlled by a control of making the revolution speed constant. Thus, the amount of fuel injection is controlled so that the revolution speed of the engine 11 is constantly maintained to be the preset revolution speed R1.

Until the time t1, the hydraulic operation element is not driven. Therefore, the main pump 14 is in a stand-by state. Therefore, the engine 11 is in an idling state, and the engine torque is a no-load torque τ1. Because the pump load increases on or after the time τ1, the amount of fuel injection to the engine 11 is increased so that the engine torque increases. The increase of the engine torque on or after the time t1 is abrupt, and the engine torque increases to a certain level within a short time. Accordingly, a sufficient engine torque is output relative to the pump output. Under this state, the engine revolution speed recovers to the preset revolution speed R1. Because the engine torque is sufficiently great relative to the pump output, the amount of fuel injection to the engine 11, which has been increasing on or after the time t1, is then suppressed (decreased). With this, on or after the time t2, the engine torque abruptly decreases as illustrated in (c) of FIG. 7.

However, the pump load continuously increases on or after the time t2. The engine torque cannot withstand the pump output, and the engine revolution speed drops again. At this time, the amount of fuel injection is increased so that the decreased engine torque is increased again. However, the engine torque cannot immediately follow the increased pump output. Therefore, a state where the engine torque is not sufficient for the pump output continues for a while, and the engine revolution speed is excessively decreased as illustrated in (d) of FIG. 7 without preventing the engine revolution speed from decreasing.

The excessive decrease of the engine revolution speed along with the increase of the pump load described above introduces an excessive increase of the amount of fuel injection in order to recover the engine revolution speed. Therefore, the fuel consumption of the engine 11 is caused to be degraded. Within the embodiment, an excessive decrease of the engine revolution speed is prevented by causing the motor generator 12 to perform the electrical power generating operation while the output limit of the hydraulic pump decreases once and then increases.

Figure 8:
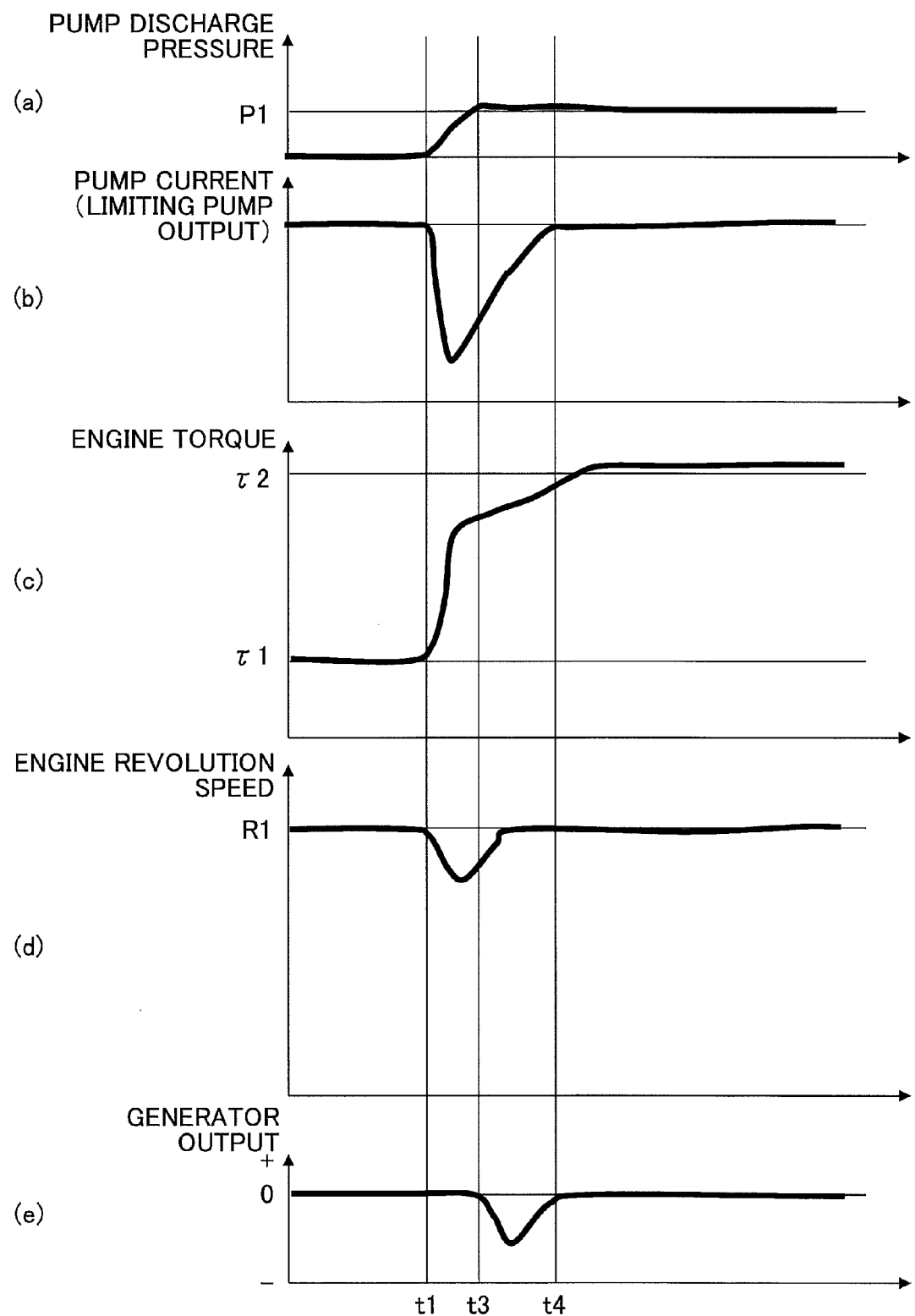
FIG. 8 is a time chart for explaining a change of an engine revolution speed when a motor generator undergoes an electrical power generating operation while a limiting pump output is controlled to be small.

FIG. 8 is a time chart for explaining a change in the engine revolution speed when the motor generator undergoes the electrical power generating operation while the pump output limit is controlled to be small. Referring to FIG. 8, (a) is a graph illustrating a change in a pump discharge pressure, and (b) is a graph illustrating a change in a pump current (a pump output limit). Referring to FIG. 8, (c) is a graph illustrating a change in an engine torque, and (d) is a graph illustrating a change in an engine revolution speed. In FIG. 8, (e) is a graph illustrating a change in the output from the motor generator 12. In the ordinate axis of (e) of FIG. 8, a minus side less than zero represents an output by electrical power generation, and a plus side greater than zero represents an output by power-running. The increase of the pump discharge pressure illustrated in (a) of FIG. 8 and the decrease of the pump current illustrated in (b) of FIG. 8 are similar to the increase of the pump load illustrated in (a) of FIG. 7 and the decrease of the pump current illustrated in (b) of FIG. 7.

Within the embodiment, when the pump discharge pressure reaches a predetermined preset pressure at a time t3 as illustrated in (a) and (e) of FIG. 8, the motor generator 12 is caused to perform the electrical power generating operation even though the pump output limit is deactivated (the output limit is small) as illustrated in (b) of FIG. 8. In the electrical power generating operation of the motor generator 12, the output of the engine 11 is a drive source for the electrical power generating operation. Therefore, the load caused by the electrical power generating operation of the motor generator 12 is applied to the engine 11, and the load on the engine 11 appropriately increases on or after a time t3. Therefore, the amount of fuel injection supplied to the engine 11 increases in order to deal with the load on or after the time t3. With this, the engine torque continues to increase on or after the time t3 as illustrated in (c) of FIG. 8.

Because the engine torque continuously increases on or after the time t3, the engine 11 withstands the pump load and the engine revolution speed increases so as to be recovered to the preset revolution speed R1 as illustrated in (d) of FIG. 8. Further, after the engine revolution speed is recovered to the preset revolution speed R1, the engine revolution speed is maintained to be the preset revolution speed R1. As described, on or after the time t3, the engine revolution speed does not decrease and is maintained to be the preset revolution speed R1. Therefore, the excessive decrease of the engine revolution speed described above is prevented from occurring.

At the time t3 when the motor generator 12 performs the electrical power generating operation, the pump discharge pressure increases to be the predetermined preset pressure P1. The time t3 is earlier than a time when the engine revolution speed is recovered to the preset revolution speed R1 (the time t2 in (d) of FIG. 7).

Within the embodiment, the revolution speed of the motor generator 12 is controlled and the target revolution speed of the motor generator 12 is set to be a value slightly lower than a revolution speed corresponding to the preset revolution speed R1 of the engine 11 as described below so that the motor generator 12 performs the electrical power generating operation.

Referring to (c) of FIG. 8, on or after the time t3, the engine torque continuously increases and reaches a preset torque τ2 at a time t4. The preset torque τ2 is set to a torque value slightly lower than a torque which can be output by the engine 11 when the pump load is set to be the maximum. Specifically, the preset torque τ2 is set to have a torque value where the engine torque can be securely increased by controlling only the revolution speed of the engine 11 after the engine torque reaches the torque value.

At a time t4 when the engine torque reaches the preset torque τ2, the electrical power generating operation of the motor generator 12 is deactivated, and the electrical power generating operation is stopped. The engine revolution speed reaches the preset revolution speed R1 before the time t4, and the engine revolution speed is maintained to be the preset revolution speed R1 on or after the time t4.

Figure 9:
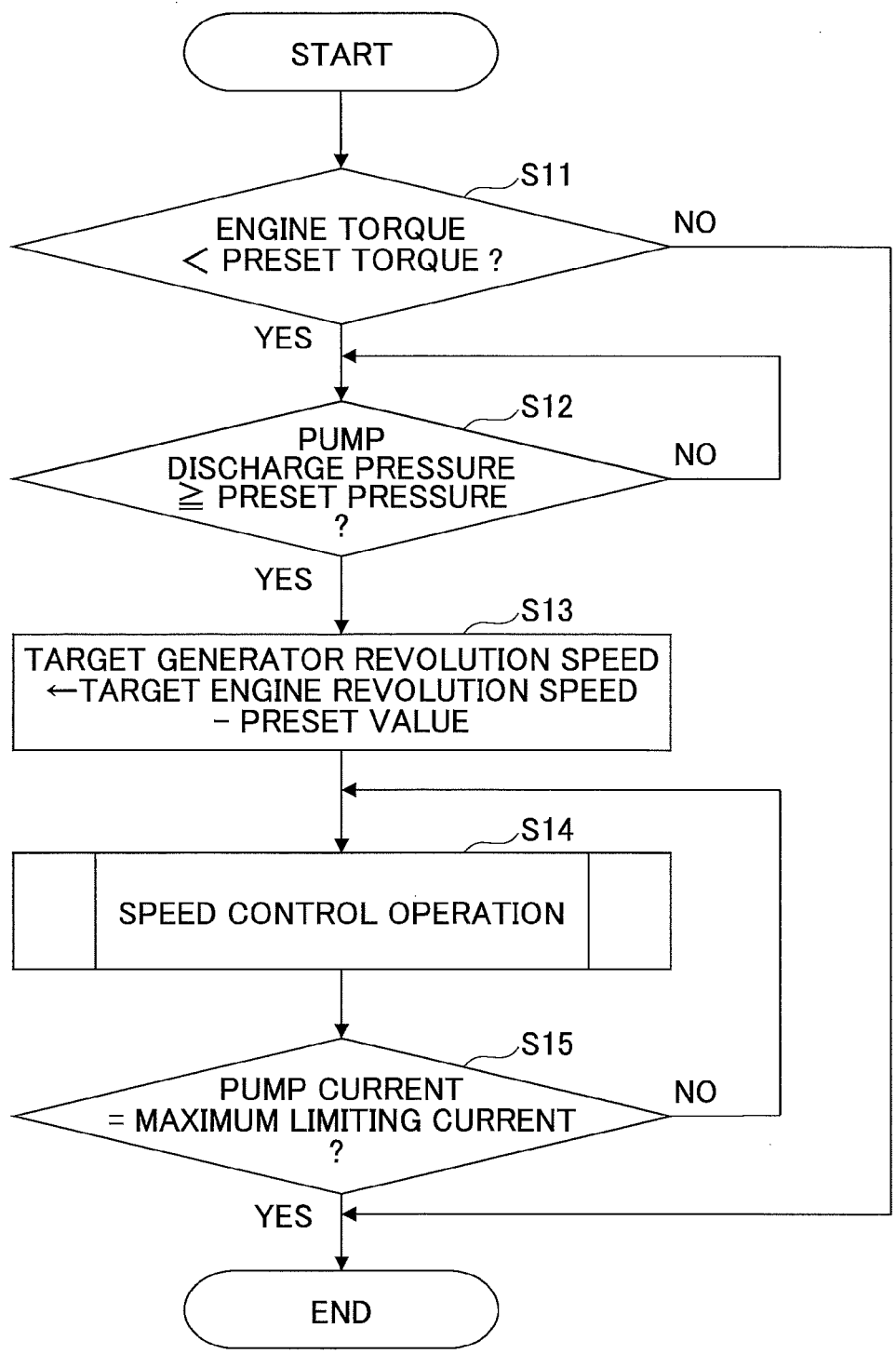
FIG. 9 is a flow chart of an exemplary process of controlling an engine revolution speed.

FIG. 9 is a flowchart of the process of controlling the engine revolution speed using the above method of controlling the shovel. The process of controlling the engine revolution speed illustrated in FIG. 9 is mainly performed by the controller 30.

After the process of controlling the engine revolution speed is started, it is determined whether the engine torque is smaller than the preset torque τ2 in step S11. In a case where the engine torque is equal to or greater than the preset torque τ2 in NO of step S11, the process of controlling the engine revolution speed is not performed, and the process ends. In a case where the engine torque is smaller than the preset torque τ2 in YES of step S11, the process moves to step S12.

In step S12, it is determined whether the pump load is equal to or greater than a preset load L1. When the pump discharge pressure is smaller than the preset pressure P1 in NO of step S12, step S12 is repeated until the pump discharge pressure becomes equal to or greater than the preset pressure P1. In step S12, if it is determined that the pump discharge pressure is equal to or greater than the preset pressure P1 in YES of step S12, the process moves to step S13. In the example illustrated in (a) of FIG. 8, the pump discharge pressure is determined to be equal to or greater than the preset pressure P1 at the time t3.

In step S13, the target revolution speed of the motor generator 12 is set so as to have a value slightly smaller than the revolution speed corresponding to the preset revolution speed R1 of the engine 11. Specifically, a value slightly lower than the revolution speed corresponding to the preset revolution speed R1 of the engine 11 is set, and the preset value is subtracted from the revolution speed corresponding to the preset revolution speed R1 of the engine 11 to thereby set the target revolution speed of the motor generator 12. Here, the motor generator 12 is switched to control the revolution speed, for example, at the time t1. Therefore, the motor generator 12 runs at a revolution speed higher than the target revolution speed. In order to apply the load on the engine 11 to suppress the revolution and to make the revolution speed approach the target revolution speed, the electrical power generating operation is performed. In an example illustrated in (e) of FIG. 8, the motor generator 12 starts the electrical power generating operation at a time t3.

Subsequently, in step S14, the motor generator 12 is controlled by a speed control and an output by electrical power generation increases. Because the engine revolution speed increases on and after the time t3 so as to approach the preset revolution speed R1, the revolution speed of the motor generator 12 approaches the target revolution speed and the electric-generating capacity in the motor generator 12 becomes small.

In step S15, it is determined whether the pump current reaches the maximum limiting current. In a case where the pump current does not reach the maximum limiting current (NO in step S15), the process returns to step S14 and a speed control of the motor generator 12 is continued. Said differently, an electrical power generating operation of the motor generator 12 continues.

On the other hand, in a case where it is determined that the pump current reaches the maximum limiting current (YES in step S15), the revolution speed control of the motor generator 12 is deactivated so that the motor generator 12 stops the electrical power generating operation. In an example illustrated in (e) of FIG. 8, the electric-generating capacity becomes substantially zero at a time t4 when the pump current reaches the maximum limiting current. In this embodiment, at the time t4 when the engine torque reaches the maximum limiting current, the electrical power generating operation of the motor generator 12 is stopped by switching the control of the motor generator 12 to an ordinary torque control. As described, on or after the time t4, the engine torque can be increased by the control of making the revolution speed of the engine 11 constant.

By controlling the revolution speed of the engine 11 using the above method of controlling the shovel, it is possible to suppress an excessive decrease of the engine revolution speed while the pump output limit is great. Thus, it is possible to solve a problem caused by the excessive decrease of the engine revolution speed.

In step S12 described above, if it is determined that the pump discharge pressure is equal to or greater than the preset pressure P1, the motor generator 12 performs the electrical power generating operation. However, a timing of starting the electrical power generating operation of the motor generator 12 can be determined by another method. As the other method, the motor generator 12 is caused to perform the electrical power generating operation at a time when the pump current has, for example, a predetermined value where the pump current once drops and starts increasing (a pump current value at the time t3 in (b) of FIG. 8). Alternatively, a discharge pressure force of the main pump 14 is monitored as the load. At the time when the discharge pressure force reaches a predetermined value, the motor generator 12 may be caused to perform the electrical power generating operation. Further, the electrical power generating operation of the motor generator 12 may be started at a time when the engine revolution speed is recovered to a predetermined revolution speed around the preset revolution speed R1 without determining a start time of the electrical power generating operation based on the load of the main pump 14.

Further, as to a timing of stopping the electrical power generating operation of the motor generator 12, the revolution speed control of the motor generator 12 may be deactivated so that the motor generator 12 stops the electrical power generating operation at the time when the engine torque reaches the preset torque τ2 as described in step S5 of FIG. 6.

Figure 10:
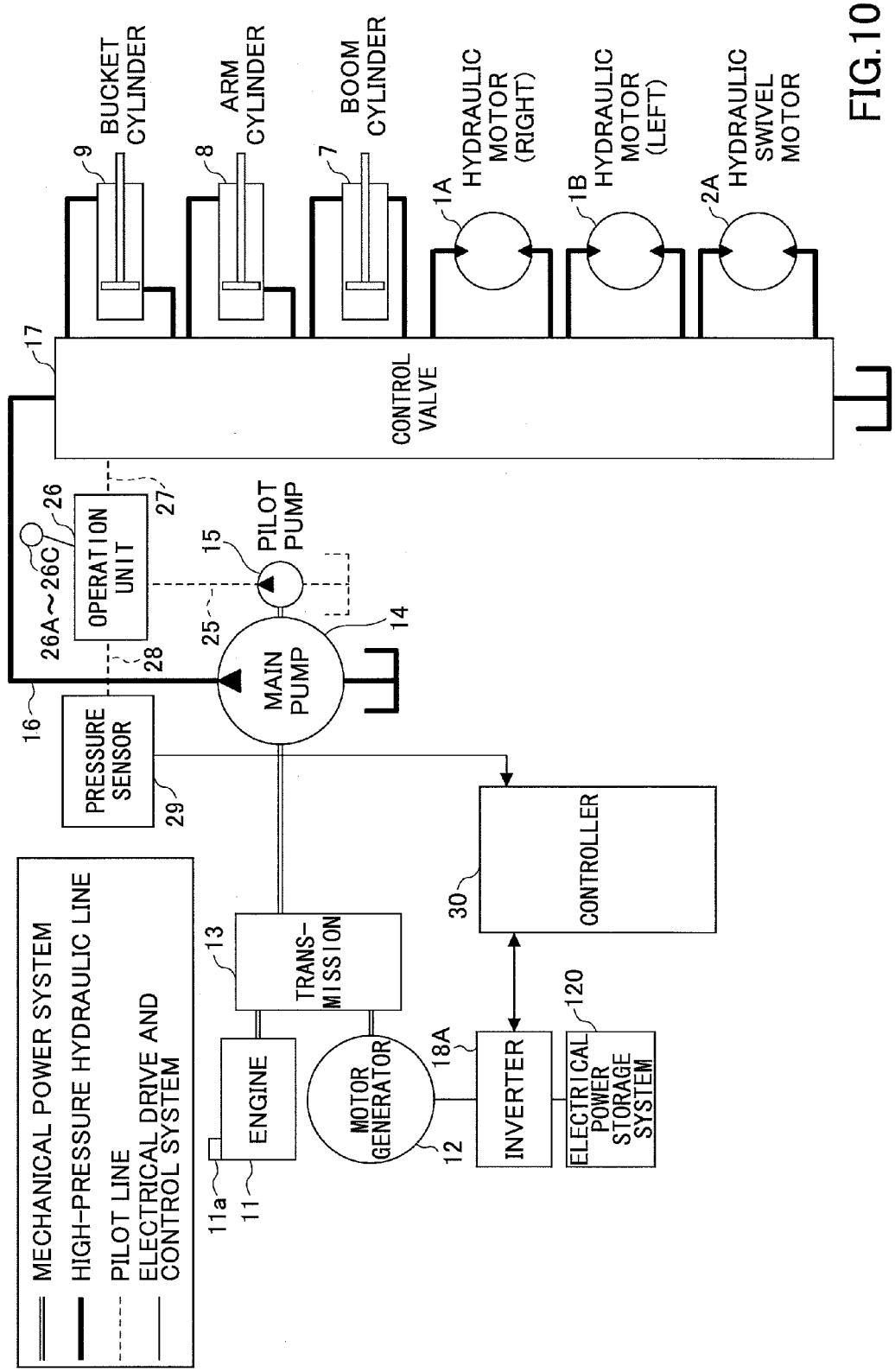
FIG. 10 is a block diagram illustrating a structure of a drive system of a shovel, in which a swivel mechanism is driven by a swivel hydraulic motor.
Figure 11:
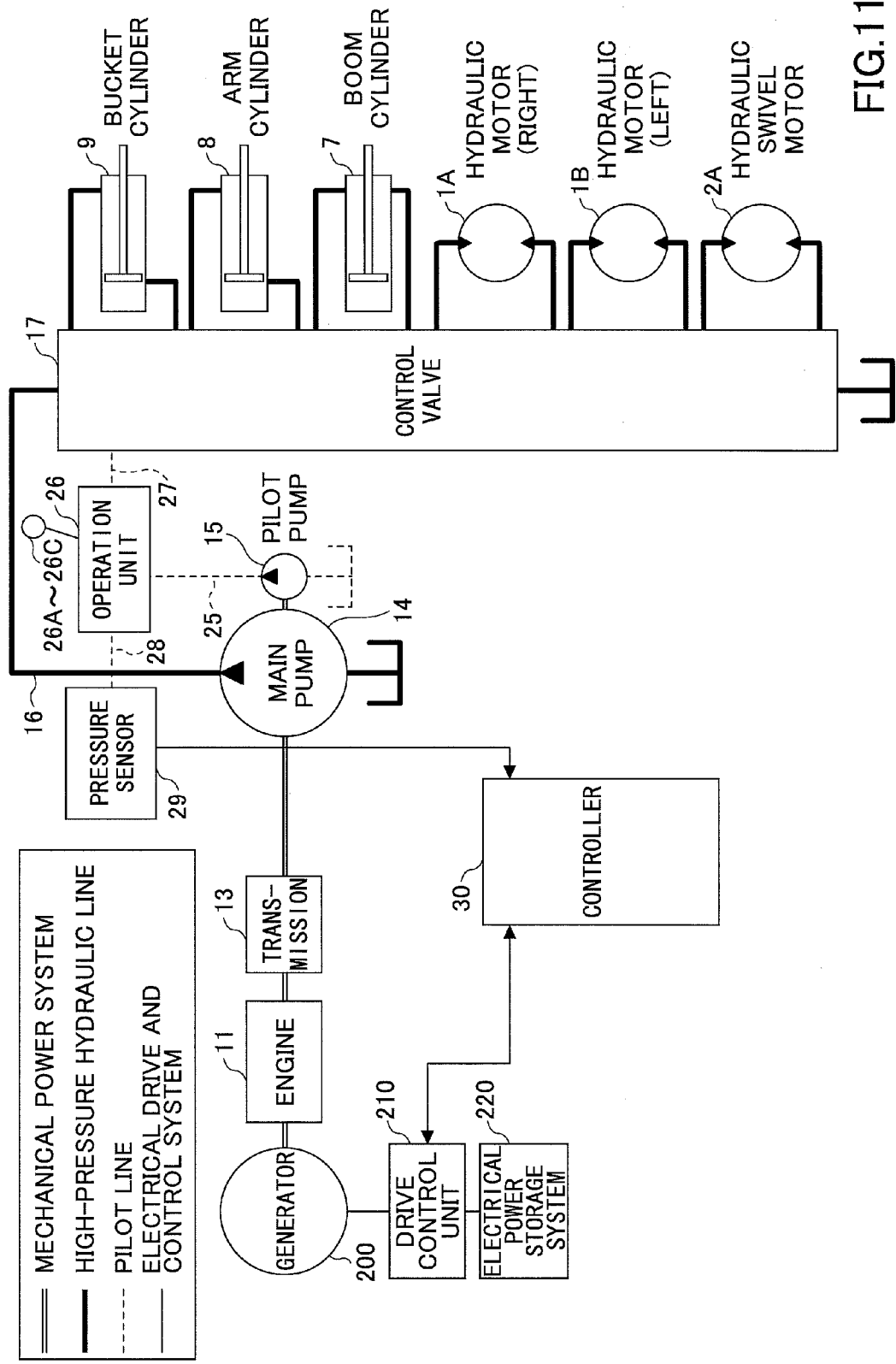
FIG. 11 is a block diagram illustrating a structure of a drive system of a hydraulic shovel.

In the above description, the swivel mechanism 2 is electromotive. However, the swivel mechanism 2 may be hydraulically driven not electrically driven. FIG. 10 is a block chart illustrating a driving system of the shovel, in which the swivel mechanism illustrated in FIG. 2 is changed to a hydraulic drive. Referring to the shovel illustrated in FIG. 10, a hydraulic swivel motor 2A is connected to the control valve 17 instead of the electric swivel motor 21, and the swivel mechanism 2 is driven by the hydraulic swivel motor 2A. In this shovel, a drop of the engine revolution speed is suppressed and the increase of the fuel consumption rate can be suppressed by applying the load to the engine 11 by performing the electrical power generating operation in the motor generator 12.

The shovel, in which the engine 11 and the motor generator 12 are connected to the main pump 14 being the hydraulic pump to thereby drive the main pump 14, is applied to the above embodiment of the present invention. However, the present invention can be applied not only to this type of the shovel but also to a shovel in which the main pump 14 is driven by the engine 11. In this case, because the motor generator 12 does not exist, a generator 200 is provided to apply the load to the engine 11. The electric power obtained by the electrical power generating operation in the generator 200 is supplied to an electrical power storage system 220 through a drive control unit 210 for the generator such as a voltage regulator or an inverter, and is stored in the electrical power storage system 220. The electrical power storage system 220 may be provided to drive an electric component such as an air conditioner.

In the above structure, the generator 200 functions as the motor generator 12 in the above embodiments. While the output from the main pump 14 is increasing, the electrical power generating operation is performed by the generator 200 to apply the load onto the engine 11. With this, it is possible to suppress the drop of the engine revolution speed and smoothly increase the engine torque.

Reference symbols typically designate as follows:

1: lower-part traveling body;
1A, 1B: hydraulic motor;
2: swivel mechanism;
3: hydraulic swivel motor;
3: upper-part swiveling body;
4: boom;
5: arm;
6: bucket;
7: boom cylinder;
8: arm cylinder;
9: bucket cylinder;
10: cabin;
11: engine;

11a: supercharger;
12: motor generator;
12A: revolution detector;
13: transmission;
14: main pump;
15: pilot pump;
16: high-pressure hydraulic line;
17: control valve;
18A, 20: inverter;
19: capacitor;
21: electric swivel motor;
22: resolver;
23: mechanical brake;
24: swivel transmission;
25: pilot line;
26: operation unit;
26A, 26B: lever;
26C: pedal;
27: hydraulic line;
28: hydraulic line;
29: pressure sensor;
30: controller;
100: buck-boost converter;
110: DC bus;
111: DC bus voltage detecting unit;
112: capacitor voltage detecting unit;
113: capacitor current detecting unit;
120: electrical power storage system;
200: generator;
210: drive control unit; and
220: electrical power storage system.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the shovel has been described in detail, it should be understood that the various changes, substitutions, and alterations could be made hereto without departing from the spirit and scope of the invention.

What is claimed is:

1. A shovel comprising:
    an internal combustion engine in which an amount of fuel injection is controlled so that a revolution speed is controlled to constantly be a first target revolution speed;
    a variable capacity hydraulic pump configured to vary an output limit value and connected to the internal combustion engine;
    a generator connected to the internal combustion engine; and
    a control unit for controlling the generator,
    wherein the control unit has a function of controlling a load of the variable capacity hydraulic pump applied onto the internal combustion engine by variably limiting the output limit value of the variable capacity hydraulic pump, the control unit controlling the amount of fuel injection of the internal combustion engine to increase an output torque so as to recover the revolution speed in response to a drop of the revolution speed of the internal combustion engine caused by an increase of the load on the variable capacity hydraulic pump,
    wherein the control unit varies the output limit value so as to increase the load of the variable capacity hydraulic pump applied onto the internal combustion engine and simultaneously causes the generator to start performing an electrical power generating operation when the output limit value becomes a predetermined value and the revolution speed of the internal combustion engine is lower than the first target revolution speed in order to prevent the revolution speed of the internal combustion engine from rising for a predetermined period of time.

2. The shovel according to claim 1,
    wherein the control unit causes the generator to perform the electrical power generating operation to apply the load onto the internal combustion engine so as to prevent the revolution speed of the internal combustion engine from rising for a predetermined period of time-when the revolution speed of the internal combustion engine recovers to be a second target revolution speed lower than the first target revolution speed.

3. The shovel according to claim 1,
    wherein the control unit controls a revolution speed of the generator to set a target revolution speed of the generator to have a value smaller than the target revolution speed of the internal combustion engine when the load on the hydraulic pump is increasing so as to cause the generator to perform an operation of decelerating the internal combustion engine.

4. The shovel according to claim 1,
    wherein the control unit causes the generator to stop performing the electrical power generating operation when the output torque of the internal combustion engine is recovered to have a predetermined value.

5. The shovel according to claim 1,
    wherein the control unit causes the generator to stop performing the electrical power generating operation when the output limit value of the hydraulic pump is recovered to have a maximum value.

6. A method of controlling a shovel including an internal combustion engine in which an amount of fuel injection is controlled so that a revolution speed is controlled to constantly be a first target revolution speed,
    a variable capacity hydraulic pump configured to vary an output limit value and connected to the internal combustion engine, and
    a generator connected to the internal combustion engine,
    a control unit for controlling the generator, the control unit having a function of controlling a load of the variable capacity hydraulic pump applied onto the internal combustion engine by variably limiting the output limit value of the variable capacity hydraulic pump, the method of controlling the shovel comprising:
    controlling, by the control unit, the amount of fuel injection of the internal combustion engine to increase an output torque so as to recover the revolution speed in response to a drop of the revolution speed of the internal combustion engine caused by an increase of the load on the variable capacity hydraulic pump, and
    varying, by the control unit, the output limit value so as to increase the load of the variable capacity hydraulic pump applied onto the internal combustion engine and simultaneously causing the generator to start performing an electrical power generating operation when the output limit value becomes a predetermined value and the revolution speed of the internal combustion engine is lower than the first target revolution speed in order to prevent the revolution speed of the internal combustion engine from rising for a predetermined period of time.

7. The method of controlling the shovel according to claim 6,
    wherein the control unit causes the generator to perform the electrical power generating operation to apply the load onto the internal combustion engine to prevent the revolution speed of the internal combustion engine from rising for a predetermined period of time when the revolution speed of the internal combustion engine recovers to be a second target revolution speed lower than the first target revolution speed.

8. The method of controlling the shovel according to claim 6,
wherein the control unit controls a revolution speed of the generator to set a target revolution speed of the generator to have a value smaller than the target revolution speed of the internal combustion engine when the load on the hydraulic pump is increasing so as to cause the generator to perform an operation of decelerating the internal combustion engine.

9. A shovel comprising:
an internal combustion engine in which an amount of fuel injection is controlled so that a revolution speed is controlled to constantly be a first target revolution speed;
a variable capacity hydraulic pump configured to vary an output limit value for the internal combustion engine and connected to the internal combustion engine;
a generator connected to the internal combustion engine; and
a control unit for controlling the generator,
wherein the control unit controls to increase an output torque so as to recover the revolution speed when the revolution speed of the internal combustion engine is lower than a first target revolution speed because of an increase of the load on the variable capacity hydraulic pump, and
simultaneously the control unit causes the generator to perform an electrical power generating operation to apply the load onto the internal combustion engine so as to prevent the revolution speed of the internal combustion engine from rising for a predetermined period of time while the control unit causes the output limit value to vary in a direction of increasing the load onto the internal combustion engine so as to increase the load of the variable capacity hydraulic pump applied onto the internal combustion engine.

* * * * *